(No Model.)

G. W. BLAKE.
LAG SCREW FOR PIPE HANGERS.

No. 317,613. Patented May 12, 1885.

Witnesses:
Henry Hey
Henry McBride

Inventor:
Geo. W. Blake
by his Attys
Brown & Hall

UNITED STATES PATENT OFFICE.

GEORGE W. BLAKE, OF NEW YORK, N. Y.

LAG-SCREW FOR PIPE-HANGERS.

SPECIFICATION forming part of Letters Patent No. 317,613, dated May 12, 1885.

Application filed March 24, 1885. (No model.)

*To all whom it may concern:*

Be it known that I, GEORGE W. BLAKE, of the city and county of New York, in the State of New York, have invented a new and useful Improvement in Lag-Screws for Pipe-Hangers, of which the following is a specification.

Where lines of steam or gas pipe are to be suspended below ceilings or floors and in analogous situations, hangers are often employed which consist of a strap or bail-like portion embracing the pipe and pivoted to the end or head of a lag-screw, which is to be inserted in the floor-beam or other support from which the hanger is suspended.

In order to afford convenience for suspending or hanging the pipe in various situations, it is often desirable that these lag-screws should be of various lengths, or should have an extension beyond the screw-thread, such extension being greater or less in length for various situations—for example, for some situations the screw need only be slightly greater in length than its thread, while in other situations it might be desirable to have an extension of a foot or more beyond the thread.

Heretofore it has been necessary to provide or make special screws of the length required; and the object of my invention is to provide a screw having an extension which adapts it for use in situations where the pipe is to be hung at a remote distance from the floor beams or support, and which may be cut at any point to obtain a less length of screw.

The invention consists in a lag-screw for a pipe-hanger provided with a long head or extension, having holes at intervals in its length transverse to the axis of the screw, and which may be cut transversely at any point between those holes to obtain the desired length of screw.

Figure 2:
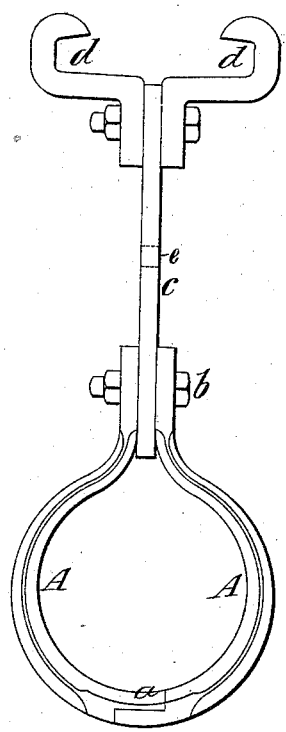
Figure 1:
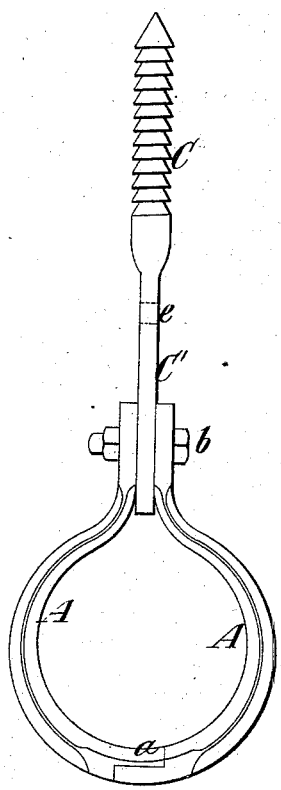
Figure 3:
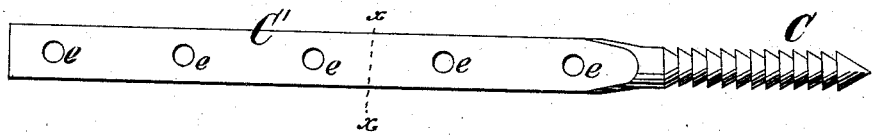

In the accompanying drawings, Figure 1 represents a hanger having my improved lag-screw attached. Fig. 2 represents a hanger of slightly modified form, hereinafter referred to, and Fig. 3 represents my improved lag-screw as it is made and sold to the trade.

Similar letters of reference designate corresponding parts in all the figures.

The hanger here chosen to represent my invention is of the kind shown and described in my United States Letters Patent No. 311,282, dated January 27, 1885. This hanger comprises a stirrup or bail-like portion, which is made in two sections, A A, detachably connected at their lower ends, *a*, and connected at their upper ends by a pivot-bolt, *b*, with the lag-screw C.

My invention is not limited to this particular style of hanger, as such lag-screws may be employed in connection with hangers consisting of a solid or undivided stirrup or bail-like portion.

The hanger shown in Fig. 2 comprises a stirrup or bail-like portion composed of sections A A, detachably connected at their lower ends, *a*, and connected by a pivot-bolt, *b*, with a strap or link, *c*, pivoted at its upper end to the clips or clamping-jaws *d*. This style of hanger is adapted for use in connection with rolled iron floor-beams, the clips or clamps *d* serving to grasp the flanges of such beams.

In Fig. 3 I have represented my improved lag-screw C as it is made and sold to the trade. This screw has an ordinary lag-screw thread and a long head or extension, C', provided at intervals in its length with holes *e*, which are transverse to the axis of the screw. The screw C may have an extension of any length desired beyond its thread, and any number of holes, *e*, may be formed in it. As here shown, the extension C' has five holes, *e*.

It will be obvious that if the screw when sold has an extension, C', long enough to adapt it for use in situations where the pipe is to be suspended at a point most distant from the floor beams or support, its extension C' may be cut at any point between the holes *e* in order to obtain a screw of any less length which may be desired. For example, in the hanger shown in Fig. 1 the extension is cut at a point between the second and third holes from the thread, and were a longer screw required the extension C' could be cut between any of the other holes. Those pieces which are cut from the extension to obtain screws of any desired length are not wasted, but may be employed to form the straps or links *c* of hangers, such as are shown in Fig. 2. By cutting the extension at the dotted line *x x*, Fig. 3, so as to obtain a screw of the length shown in Fig. 1, there would also be obtained a link or strap such as is shown in Fig. 2, and in which are three holes, *e*. If a shorter link or strap is desired, then it could be obtained by cutting off a remnant, so as to leave only two holes.

It will be seen that by my invention I provide an article which may be cut to any length desired in order to obtain a screw of the required length, and which avoids the necessity of making a special screw of any given length of head required in a particular situation.

What I claim as my invention, and desire to secure by Letters Patent, is—

As a new article of manufacture and sale, a lag-screw for a pipe-hanger, having a long head or extension, C', beyond its thread, and provided at intervals in its length with holes $e$, substantially as and for the purpose herein described.

GEO. W. BLAKE.

Witnesses:
FREDK. HAYNES,
MATTHEW POLLOCK.